(12) United States Patent
Schote

(10) Patent No.: US 6,378,667 B1
(45) Date of Patent: Apr. 30, 2002

(54) ARRANGEMENT AND METHOD FOR FASTENING A CALIPER ON A WHEEL CARRIER

(75) Inventor: Norbert Schote, Ammerbuch (DE)

(73) Assignee: Porsche AG, Weissach (DE)

( * ) Notice: Subject to any disclaimer, the term of this patent is extended or adjusted under 35 U.S.C. 154(b) by 0 days.

(21) Appl. No.: 09/589,364

(22) Filed: Jun. 8, 2000

(30) Foreign Application Priority Data

Jun. 8, 1999 (DE) .......................................... 199 26 000

(51) Int. Cl.[7] .............................................. F16D 65/14
(52) U.S. Cl. .................................................. 188/106 A
(58) Field of Search ............................ 188/71.7, 73.11, 188/73.32, 106 A, 73.31, 71.1; 301/105.1

(56) References Cited

U.S. PATENT DOCUMENTS

| | | | | |
|---|---|---|---|---|
| 2,731,112 A | * | 1/1956 | Berrows ..................... | 188/73.1 |
| 3,182,754 A | | 5/1965 | Hahm et al. | |
| 3,251,436 A | * | 5/1966 | Afanador et al. .......... | 188/71.1 |
| 3,251,446 A | | 5/1966 | Afanador et al. | |
| 3,705,641 A | * | 12/1972 | Brooks et al. ............. | 188/73.3 |
| 3,729,069 A | * | 4/1973 | Klein et al. ................ | 188/71.1 |
| 4,046,232 A | * | 9/1977 | Kellogg ..................... | 188/73.1 |
| 4,093,043 A | * | 6/1978 | Smith ........................ | 188/73.6 |
| 4,369,862 A | * | 1/1983 | Seki .......................... | 188/73.45 |
| 4,386,682 A | * | 6/1983 | Woo et al. ................. | 188/71.8 |
| 4,391,355 A | * | 7/1983 | Evans ........................ | 188/73.1 |
| 6,152,267 A | * | 11/2000 | Iwai et al. ................. | 188/71.1 |

FOREIGN PATENT DOCUMENTS

| | | | |
|---|---|---|---|
| DE | 1905643 | 8/1970 | |
| DE | 4313624 A1 | 11/1993 | |
| DE | 4314311 A1 | 11/1994 | |
| DE | 19755061 A1 | 7/1998 | |
| EP | 0139896 A1 | 5/1985 | |
| GB | 134949 | 12/1973 | |
| GB | 2225396 | * 5/1990 | ................ 188/71.1 |
| GB | 2225396 A | 5/1990 | |
| JP | 08284986 A | 11/1996 | |
| JP | 1341949 | 1/1997 | |
| JP | 09025967 | * 1/1997 | ................ 188/71.1 |

* cited by examiner

Primary Examiner—Christopher P. Schwartz
Assistant Examiner—Devon Kramer
(74) Attorney, Agent, or Firm—Crowell & Moring LLP

(57) ABSTRACT

A caliper is fastened by a fastening arrangement on a projecting rib of a wheel carrier. The rib has a manufacturing thickness which, for the optional fastening of a floating or fixed caliper, can be reduced on each side by an amount of thickness such that a basic thickness of the rib remains. The fixed caliper can be fastened on the exterior side and the floating caliper can be fastened on the interior side of the rib at a defined distance from the brake disk by way of screwing devices.

40 Claims, 3 Drawing Sheets

ARRANGEMENT AND METHOD FOR FASTENING A CALIPER ON A WHEEL CARRIER

BACKGROUND AND SUMMARY OF THE INVENTION

This application claims the priority of German Patent No. 199 260 00.1, filed Jun. 8, 1999, the disclosure of which is expressly incorporated by reference herein.

The invention relates to a fastening arrangement for a caliper on a wheel carrier, the caliper being fastened on a projecting rib and partially reaching over a brake disk which has a brake lining extending on both sides in the caliper.

From German Patent Document DE 43 13 624 A1, a fastening of a caliper on a wheel carrier is known, in which case the caliper is connected with the wheel carrier on the interior side of the wheel carrier, that is, on the side facing the wheel. Furthermore, from German Patent Document DE 43 14 311 A1, a steering knuckle arrangement for motor vehicles is known, in the case of which a floating caliper disk brake and a wheel axle bearing are fastened to a carrier component.

It is an object of the invention to provide a fastening arrangement for a caliper on a wheel carrier which permits a simple mounting of a fixed caliper or of a floating caliper.

According to preferred embodiments of the invention, this object is achieved by providing an arrangement of the above-noted type, wherein the rib has a manufacturing thickness which, for optional fastening of a fixed or floating caliper, can be reduced on each side by an amount of thickness such that a basic thickness of the rib remains, and wherein the fixed caliper can be fastened on an exterior side and the floating caliper can be fastened on an interior side of the rib at a defined distance from the brake disk by way of screwing devices.

Principal advantages achieved by means of the invention are that a wheel carrier is constructed with a projecting rib such that optionally a fastening of a floating caliper as well as of a fixed caliper is permitted by means of only low production or manufacturing expenditures. Thus, the rib has a manufacturing thickness which is constructed for the optional fastening of the floating caliper or fixed caliper and, for this purpose, can be reduced on each side by such an amount of thickness that a basic thickness of the ribs remains for fastening the caliper. With respect to the wheel, the fixed caliper is fastened on the exterior side and the floating caliper is fastened on the interior side of the rib at a defined distance with respect to the brake disk by way of screwing devices. In particular, the rib is constructed in its basic condition with a manufacturing thickness with respect to a rib center plane with rib halves which have the same thickness, in which case, in the fastened condition, the rib is constructed with a brake caliper asymmetrically with respect to the center plane.

So that a correspondingly defined distance can be maintained to the brake disk, at the side on which the caliper is fastened, the rib of the wheel carrier is therefore reduced by an amount of thickness. On the whole, irrespective of whether the thickness of the rib is reduced on the exterior side or on the interior side, a basic thickness is to be maintained for reasons of stability.

The fastening of the floating caliper on the rib of the wheel carrier takes place on the rib by means of at least one screw which is held in a threaded bore of the floating caliper, a passage bore being provided in the rib.

In contrast, the fastening of the fixed caliper on the rib of the wheel carrier takes place by means of a screw which is held in a threaded bore of the rib, and the screw projects through a passage bore of the fixed caliper.

In the construction of the wheel carrier with a rib according to the invention, which permits a reduction of the thickness corresponding to the use for a fixed caliper or a floating caliper, only one wheel carrier is required, whereby a multiplicity of parts is reduced. In addition, it is achieved by means of the wheel carrier that, with the exception of the brake disk, the components, such as the wheel hub, the wheel bearing and the drive shaft of the two calipers are identical.

For fastening the floating caliper on the interior side of the rib of the wheel carrier and for fastening the fixed caliper on the exterior side of the rib, a rib can also be used which has a basic thickness which is constructed symmetrically to a center plane. Such a construction will be used if the distance to the brake disk is maintained; that is, if, toward the interior, the large floating caliper brake and, toward the exterior, the large fixed caliper brake are to be accommodated such that the required defined distances to the brake disk are maintained.

Other objects, advantages and novel features of the present invention will become apparent from the following detailed description of the invention when considered in conjunction with the accompanying drawings.

DETAILED DESCRIPTION OF THE DRAWINGS

Figure 1:
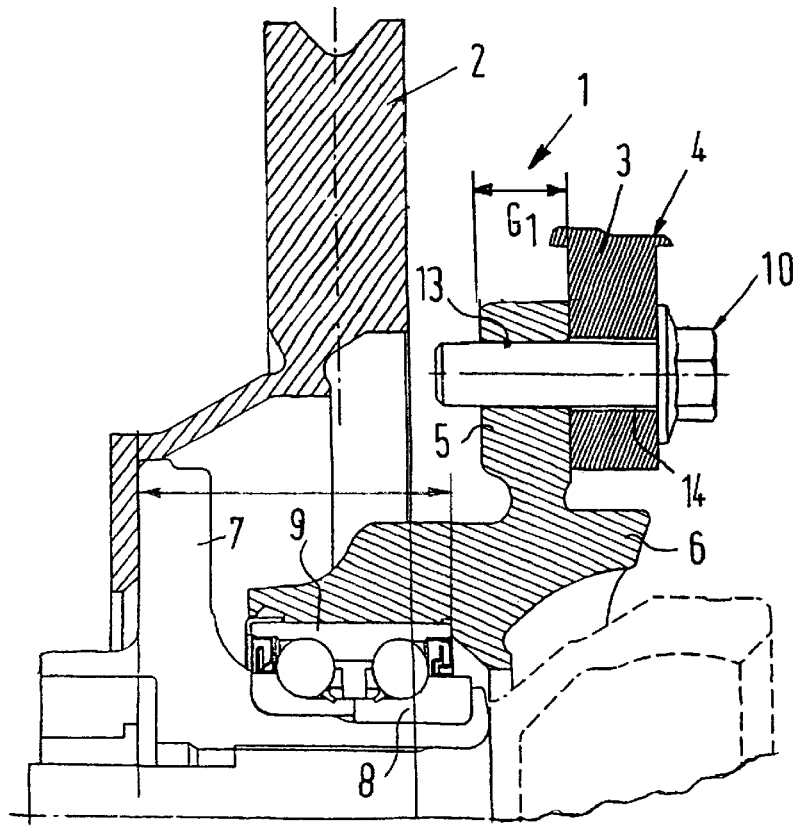
FIG. 1 is a partial sectional view of a wheel carrier with a fixed caliper connection and a brake disk on a wheel hub, constructed according to a preferred embodiment of the present invention.

Of the brake system 1, the brake disk 2; 2a as well as the connection part 3; 3a of the caliper 4; 4a on a projecting rib 5; 5a of a wheel carrier 6 are illustrated in detail. The brake disk 2; 2a is connected with a wheel hub 7 which carries a wheel bearing 8 and whose outer ring 9 is held in the wheel carrier 6.

Figure 2:
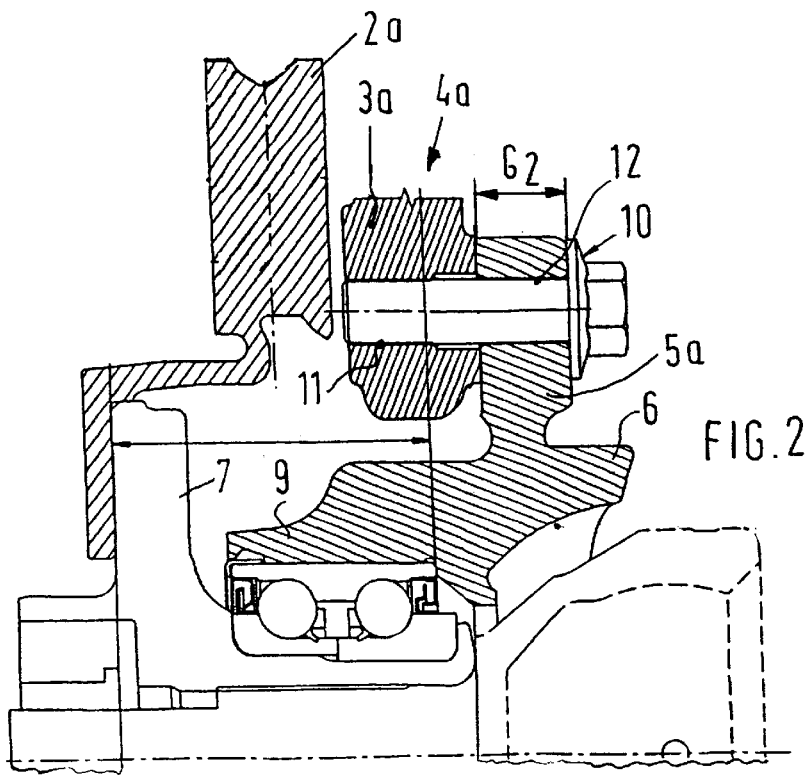
FIG. 2 is a partial sectional view of a wheel carrier with a floating caliper connection and a brake disk on the wheel hub, constructed according to a preferred embodiment of the present invention.

FIG. 1 is a detailed illustration of the fastening of a fixed caliper 4 on the wheel carrier 6, and FIG. 2 is a detailed illustration of the fastening of a floating caliper 4a on the wheel carrier 6.

The projecting rib 5 of the wheel carrier according to FIG. 1 has a manufacturing thickness $H_D$ which, for the optional fastening of the floating caliper or the fixed caliper, on each side; has a reducible amount of thickness $D_1$ and $D_2$. This amount of thickness $D_1$ and $D_2$ can be reduced as a function of the fastening of either the fixed caliper 4 or the floating caliper 4a, so that a basic thickness $G_1$ is obtained for the fixed caliper 4 and a basic thickness $G_2$ is obtained for the floating caliper 4a.

As illustrated in detail in FIG. 1, the fixed caliper 4 with its connection part 3 is arranged on the exterior side of the rib 5, the basic thickness $G_1$ of the rib 5 being used.

According to another embodiment of FIG. 2, the connection part 3a of the floating caliper 4a is arranged on the interior side of the rib 5a, the manufacturing thickness $H_D$ being reduced by the amount of thickness $D_1$ to the basic thickness $G_2$ which corresponds to the basic thickness $G_1$. In the two embodiments according to FIG. 1 and FIG. 2, the rib 5 and 5a is constructed asymmetrically with respect to a center plane M.

The fastening of the fixed caliper 4 and the rib 5 by way of the connection part 3 takes place by means of screws 10 which can be fixed in the rib 5 by way of a thread 13, a passage bore 14 being provided in the connection part 3. The floating caliper 4a is also fixed on the rib 5a of the wheel carrier 6 by way of screws 10, in which case the screws 10 are held by way of a thread 11 in the connection part 3a of the floating caliper 4a, and a passage bore 12 for the screw 10 is provided in the rib 5a.

Figure 3:
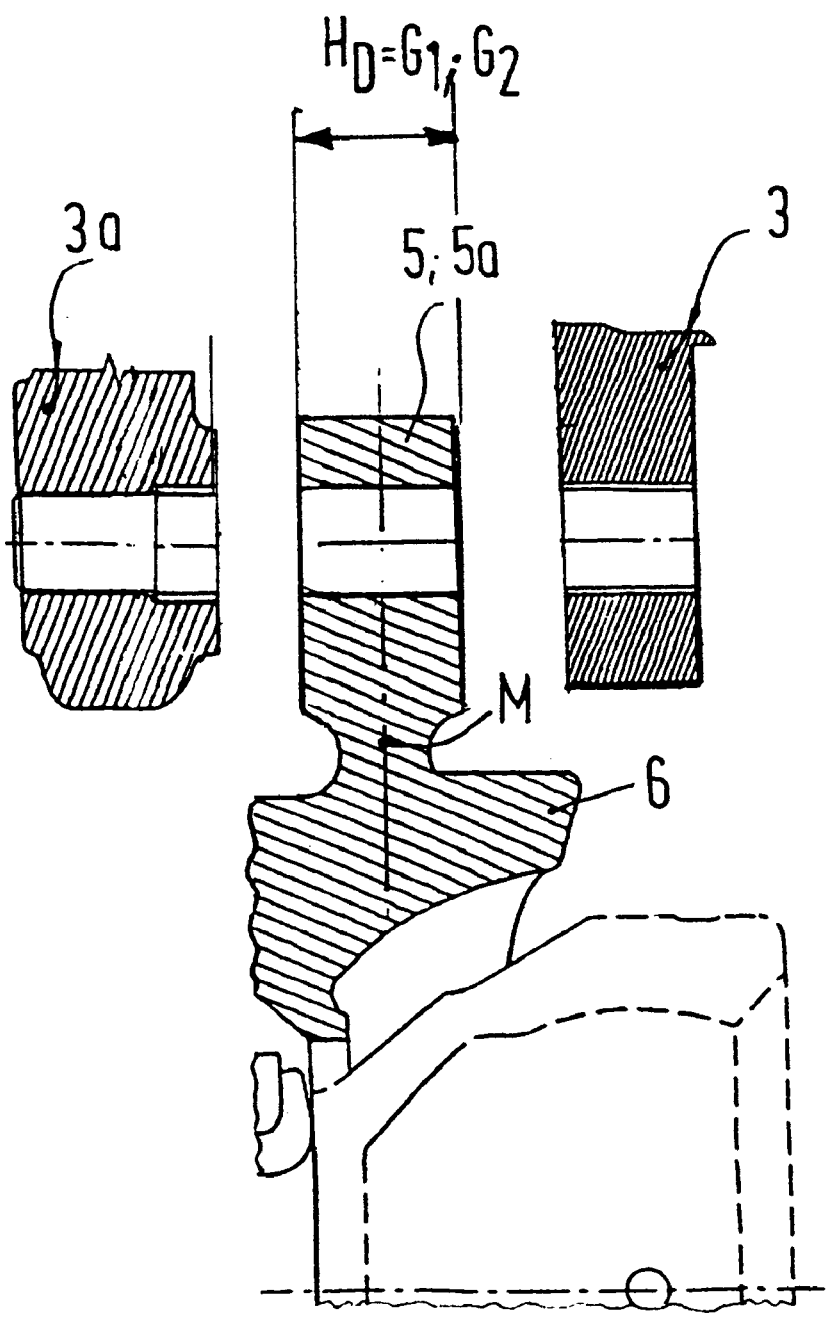
FIG. 3 is a schematic representation of the wheel carrier rib with a manufacturing thickness which is constructed identically to a basic thickness according to certain preferred embodiments of the present invention.
Figure 4:
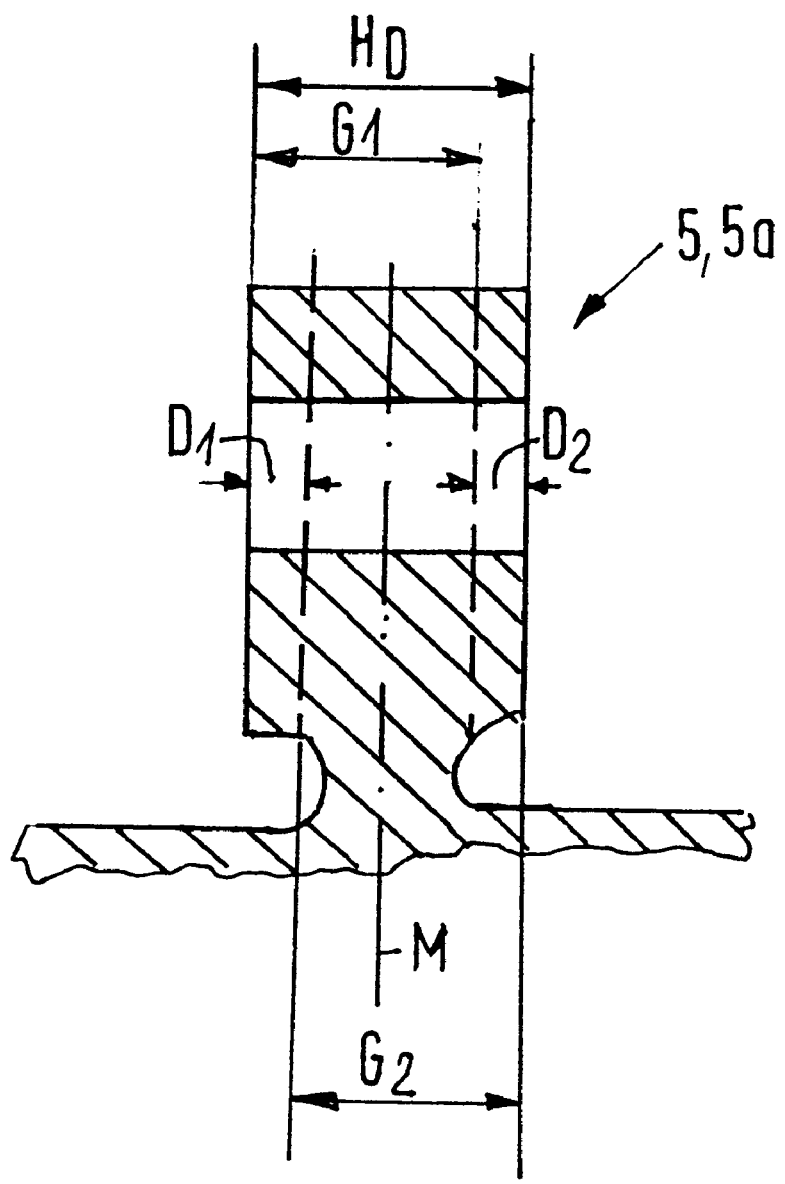
FIG. 4 is a schematic representation of the wheel carrier rib with standard measurements.

According to another embodiment of FIG. 3, the rib 5; 5a on the wheel carrier 6 can also be constructed symmetrically with respect to the center plane M, so that the floating caliper 4a can be fastened to the interior side and the fixed caliper can be fastened to the exterior side of the rib. In this case, the rib has a manufacturing thickness which corresponds to the basic thickness $G_1$ and $G_2$.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Fastening arrangement for a caliper on a wheel carrier, the caliper being fastened on a projecting rib and partially reaching over a brake disk which has a brake lining extending on both sides in the caliper,
    wherein the rib extends from the wheel carrier, the wheel carrier holding a wheel bearing outer ring, and wherein the rib has a manufacturing thickness which, for optional fastening of a fixed or floating caliper, can be reduced on each side by an amount of thickness such that a basic thickness of the rib remains, and
    wherein the fixed caliper can be fastened on an exterior side and the floating caliper can be fastened on an interior side of the rib at a defined distance from the brake disk by way of a screw.

2. Fastening arrangement according to claim 1,
    wherein the rib, in the basic condition, with the manufacturing thickness, is constructed with rib halves of identical thicknesses, with respect to a rib center plane, and the rib in the fastening condition with a caliper is constructed asymmetrically with respect to the center plane.

3. Fastening arrangement according to claim 1,
    wherein the floating caliper has a threaded bore for the fastening on the rib by means of the screw, a passage bore for the screw being provided in the rib.

4. Fastening arrangement according to claim 1,
    wherein the rib has a threaded bore for fastening the fixed caliper by means of the screw, and the screw is held in a passage bore of the fixed caliper.

5. Fastening arrangement according to claim 2,
    wherein the rib has a threaded bore for fastening the fixed caliper by means of the screw, and the screw is held in a passage bore of the fixed caliper.

6. Fastening arrangement for a caliper on a wheel carrier, the caliper being fastened on a projecting rib and partially reaching over a brake disk which, on both sides, has a brake lining extending in the caliper,
    wherein the rib extends from the wheel carrier, the wheel carrier holding a wheel bearing outer ring, and wherein the rib has a manufacturing thickness which is constructed for optional fastening of a fixed or floating caliper, and the manufacturing thickness is identical to a basic thickness, the rib being arranged approximately symmetrically to a center plane and, by way of screws, on the interior side of this rib, a floating caliper or, on the exterior side of this rib, a fixed caliper being fastenable.

7. A method of making a wheel carrier projecting rib which in use supports a brake caliper by means of threaded fastening means, comprising:
    forming the projecting rib with a predetermined manufacturing thickness, and
    reducing the manufacturing thickness at a selected side of the projecting rib to thereby accommodate fastening of fixed and floating calipers to said projecting rib.

8. A method according to claim 7,
    wherein said reducing is at an interior side which in use faces a brake disk when a floating caliper is to be fastened thereto and said reducing is at an exterior side which in use faces away from a brake disk when a fixed caliper is to be fastened thereto.

9. A method according to claim 8,
    wherein the rib, in the basic condition, with the manufacturing thickness, is constructed with rib halves of identical thicknesses, with respect to a rib center plane, and the rib in the fastening condition with a caliper is constructed asymmetrically with respect to the center plane.

10. A method of making a wheel carrier assembly having a brake disk with a lining on axially opposite facing sides and a projecting rib to which a caliper is connected by threaded fastening means, comprising:
    forming the projecting rib with a predetermined manufacturing thickness, and
    reducing the manufacturing thickness at a selected side of the projecting rib to thereby accommodate fastening of fixed or floating calipers to said projecting rib.

11. A method according to claim 10,
    wherein said reducing is at an interior side which in use faces a brake disk when a floating caliper is to be fastened thereto and said reducing is at an exterior side which in use faces away from a brake disk when a fixed caliper is to be fastened thereto.

12. A method according to claim 11,
    wherein the rib, in the basic condition, with the manufacturing thickness, is constructed with rib halves of identical thicknesses, with respect to a rib center plane, and the rib in the fastening condition with a caliper is constructed asymmetrically with respect to the center plane.

13. A method according to claim 10,
    wherein the floating caliper has a threaded bore for the fastening on the rib by means of a screw, a passage bore for the screw being provided in the rib.

14. A method according to claim 12,
    wherein the floating caliper has a threaded bore for the fastening on the rib by means of a screw, a passage bore for the screw being provided in the rib.

15. A method according to claim 10,
    wherein the rib has a threaded bore for fastening the fixed caliper by means of a screw, and the screw is held in a passage bore of the fixed caliper.

16. A method according to claim 12,
wherein the rib has a threaded bore for fastening the fixed caliper by means of a screw, and the screw is held in a passage bore of the fixed caliper.

17. A vehicle wheel assembly comprising:
a brake disk which in use is carried by a wheel hub,
a wheel carrier which in use rotatably supports the wheel hub, said wheel carrier holding a wheel bearing outer ring and having a projecting rib, and
a brake caliper supported at the projecting rib of the wheel carrier,
wherein said projecting rib exhibits an interior support surface which in use faces the brake disk and an exterior support surface facing oppositely of the interior support surface, and
wherein the projecting rib exhibits a standard thickness between said interior and exterior surfaces which is at least sufficient to optionally support a fixed brake caliper at said exterior surface and a floating caliper at said interior surface,
whereby a standard basic wheel carrier can be used optionally to support either a fixed brake caliper or a floating brake caliper at a respective defined distance from the brake disk.

18. A vehicle wheel assembly according to claim 17, wherein said projecting rib, in a basic condition, is modified by removing a predetermined thickness of material from the exterior surface for accommodating the support of the fixed caliper and by removing a similar predetermined thickness of material from the interior surface for accommodating the support of the floating caliper, while maintaining a remaining thickness which is at least sufficient to support the respective calipers at said respective defined distance from the brake disk.

19. A vehicle wheel assembly according to claim 18,
wherein the rib, in the basic condition, with the manufacturing thickness, is constructed with rib halves of identical thicknesses, with respect to a rib center plane, and the rib in the fastening condition with a caliper is constructed asymmetrically with respect to the center plane.

20. A vehicle wheel assembly according to claim 18,
wherein the floating caliper has a threaded bore for the fastening on the rib by means of a screw, a passage bore for the screw being provided in the rib.

21. A vehicle wheel assembly according to claim 18,
wherein the rib has a threaded bore for fastening the fixed caliper by means of a screw, and the screw is held in a passage bore of the fixed caliper.

22. A method of making a vehicle wheel assembly comprising:
providing a brake disk which in use is carried by a wheel hub,
providing a wheel carrier which in use rotatably supports the wheel hub, said wheel carrier having a projecting rib, and
providing a brake caliper supported at the projecting rib of the wheel carrier,
wherein said projecting rib exhibits an interior support surface which in use faces the brake disk and an exterior support surface facing oppositely of the interior support surface, and
wherein the projecting rib exhibits a standard thickness between said interior and exterior surfaces which is at least sufficient to optionally support a fixed brake caliper at said exterior surface and a floating caliper at said interior surface,
said method comprising modifying said projecting rib for accommodating support of the fixed caliper by removing a predetermined thickness of material from the exterior surface while maintaining a remaining thickness which is at least sufficient to support the respective fixed caliper, and
modifying said projecting rib in a basic condition by removing a predetermined thickness of material from the interior surface for accommodating the support of the floating caper, while maintaining said remaining thickness sufficient to support the exterior caliper.

23. A method of making a vehicle wheel assembly according to claim 22,
wherein the rib, in the basic condition, with the manufacturing thickness, is constructed with rib halves of identical thicknesses, with respect to a rib center plane, and the rib in the fastening condition with a caliper is constructed asymmetrically with respect to the center plane.

24. A method of making a vehicle wheel assembly according to claim 22,
wherein the floating caliper has a threaded bore for the fastening on the rib by means of a screw, a passage bore for the screw being provided in the rib.

25. A method of making a vehicle wheel assembly according to claim 22,
wherein the rib has a threaded bore for fastening the fixed caliper by means of a screw, and the screw is held in a passage bore of the fixed caliper.

26. A wheel carrier projecting rib which in use supports a brake caliper by means of threaded fastening means made by a process comprising the steps of:
forming the projecting rib with a predetermined manufacturing thickness, and
reducing the manufacturing thickness at a selected side of the projecting rib to thereby accommodate fastening of fixed and floating calipers to said projecting rib.

27. The wheel carrier projecting rib of claim 26,
wherein said reducing is at an interior side which in use faces a brake disk when a floating caliper is to be fastened thereto and said reducing is at an exterior side which in use faces away from a brake disk when a fixed caliper is to be fastened thereto.

28. The wheel carrier projecting rib of claim 27,
wherein the rib, in the basic condition, with the manufacturing thickness, is constructed with rib halves of identical thicknesses, with respect to a rib center plane, and the rib in the fastening condition with a caliper is constructed asymmetrically with respect to the center plane.

29. A wheel carrier assembly having a brake disk with a lining on axially opposite facing sides and a projecting rib to which a caliper is connected by threaded fastening means made by a process comprising the steps of:
forming the projecting rib with a predetermined manufacturing thickness, and
reducing the manufacturing thickness at a selected side of the projecting rib to thereby accommodate fastening of fixed floating calipers to said projecting rib.

30. The wheel carrier assembly of claim 29,
wherein said reducing is at an interior side which in use faces a brake disk when a floating caliper is to be fastened thereto and said reducing is at an exterior side which in use faces away from a brake disk when a fixed caliper is to be fastened thereto.

31. The wheel carrier assembly of claim 30, wherein the rib, in the basic condition, with the manufacturing thickness, is constructed with rib halves of identical thicknesses, with respect to a rib center plane, and the rib in the fastening condition with a caliper is constructed asymmetrically with respect to the center plane.

32. The wheel carrier assembly of claim 29, wherein the floating caliper has a threaded bore for the fastening on the rib by means of a screw, a passage bore for the screw being provided in the rib.

33. The wheel carrier assembly of claim 31, wherein the floating caliper has a threaded bore for the fastening on the rib by means of a screw, a passage bore for the screw being provided in the rib.

34. The wheel carrier assembly of claim 29, wherein the rib has a threaded bore for fastening the fixed caliper by means of a screw, and the screw is held in a passage bore of the fixed caliper.

35. The wheel carrier assembly of claim 31, wherein the rib has a threaded bore for fastening the fixed caliper by means of a screw, and the screw is held in a passage bore of the fixed caliper.

36. A vehicle wheel assembly made by a process comprising the steps of:

providing a brake disk which in use is carried by a wheel hub, providing a wheel carrier which in use rotatably supports the wheel hub, said wheel carrier having a projecting rib, and providing a brake caliper supported at the projecting rib of the wheel carrier, wherein said projecting rib exhibits an interior support surface which in use faces the brake disk and an exterior support surface facing oppositely of the interior support surface, and wherein the projecting rib exhibits a standard thickness between said interior and exterior surfaces which is at least sufficient to optionally support a fixed brake caliper at said exterior surface and a floating caliper at said interior surface, said method comprising modifying said projecting rib for accommodating support of the fixed caliper by removing a predetermined thickness of material from the exterior surface while maintaining a remaining thickness which is at least sufficient to support the respective fixed caliper, and modifying said projecting rib in a basic condition by removing a predetermined thickness of material from the interior surface for accommodating the support of the floating caliper, while maintaining said remaining thickness sufficient to support the exterior caliper.

37. The vehicle wheel assembly of claim 36, wherein the rib, in the basic condition, with the manufacturing thickness, is constructed with rib halves of identical thicknesses, with respect to a rib center plane, and the rib in the fastening condition with a caliper is constructed asymmetrically with respect to the center plane.

38. The vehicle wheel assembly of claim 37, wherein the floating caliper has a threaded bore for the fastening on the rib by means of the screw, a passage bore for a screw being provided in the rib.

39. The vehicle wheel assembly of claim 37, wherein the rib has a threaded bore for fastening the fixed caliper by means of the screw, and a screw is held in a passage bore of the fixed caliper.

40. Fastening arrangement according to claim 2, wherein the floating caliper has a threaded bore for the fastening on the rib by means of a screw, a passage bore for the screw being provided in the rib.

* * * * *